April 13, 1937.   W. K. ROSE   2,077,070
AIRPLANE
Original Filed Jan. 15, 1934    4 Sheets-Sheet 2
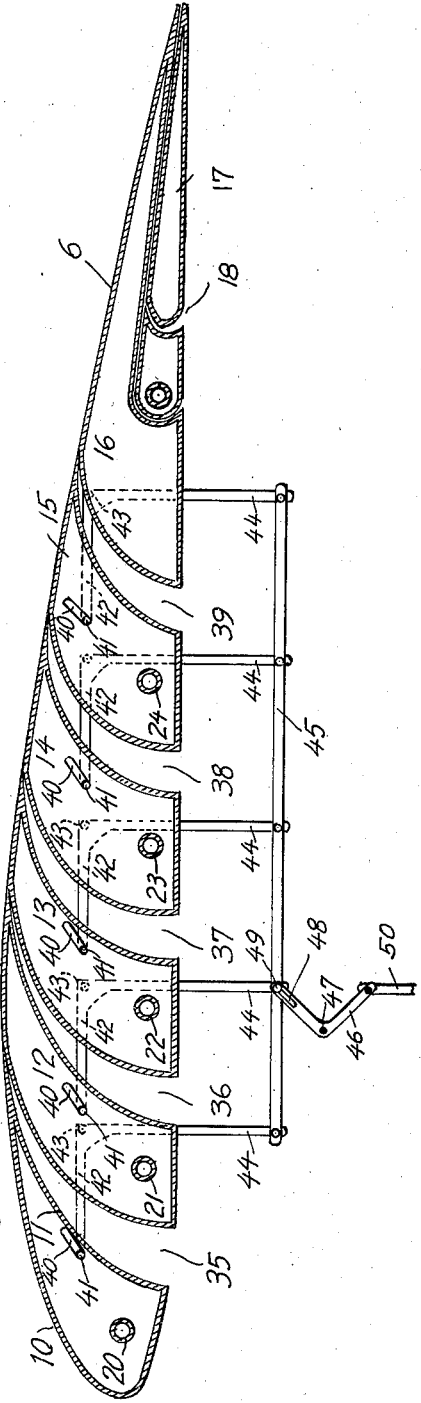
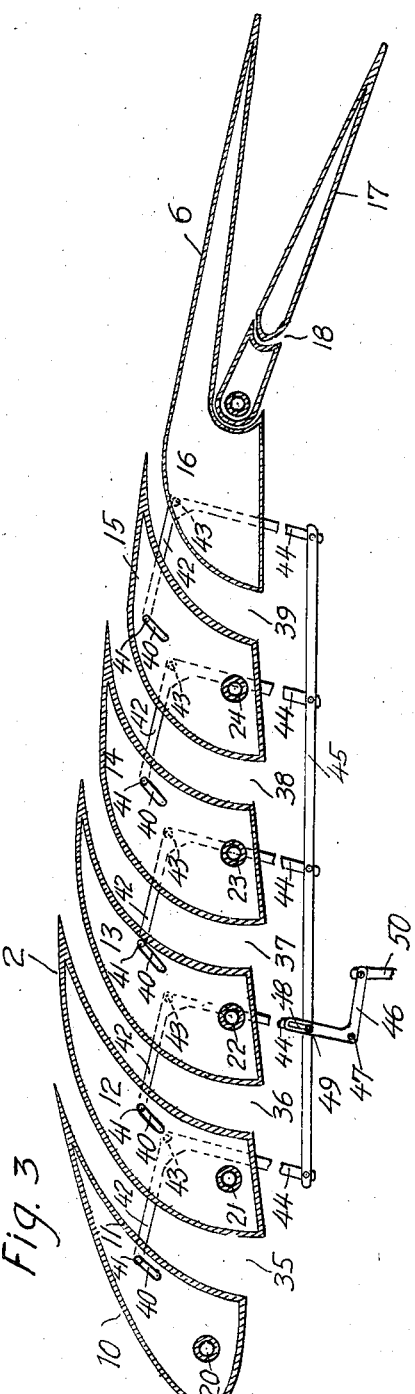
INVENTOR.
William K. Rose
BY
ATTORNEYS April 13, 1937.   W. K. ROSE   2,077,070
AIRPLANE
Original Filed Jan. 15, 1934   4 Sheets-Sheet 3
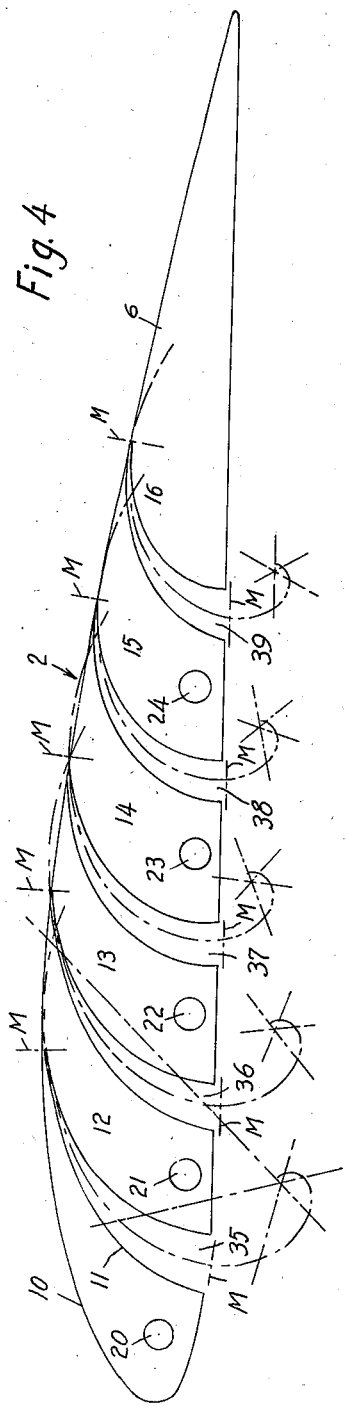
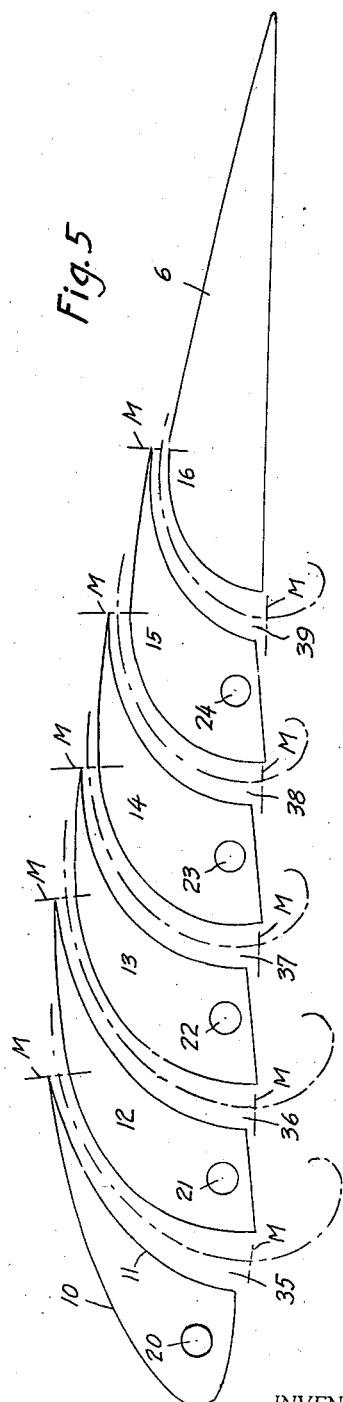
INVENTOR.
William K. Rose
BY
ATTORNEYS April 13, 1937.   W. K. ROSE   2,077,070
AIRPLANE
Original Filed Jan. 15, 1934   4 Sheets-Sheet 4

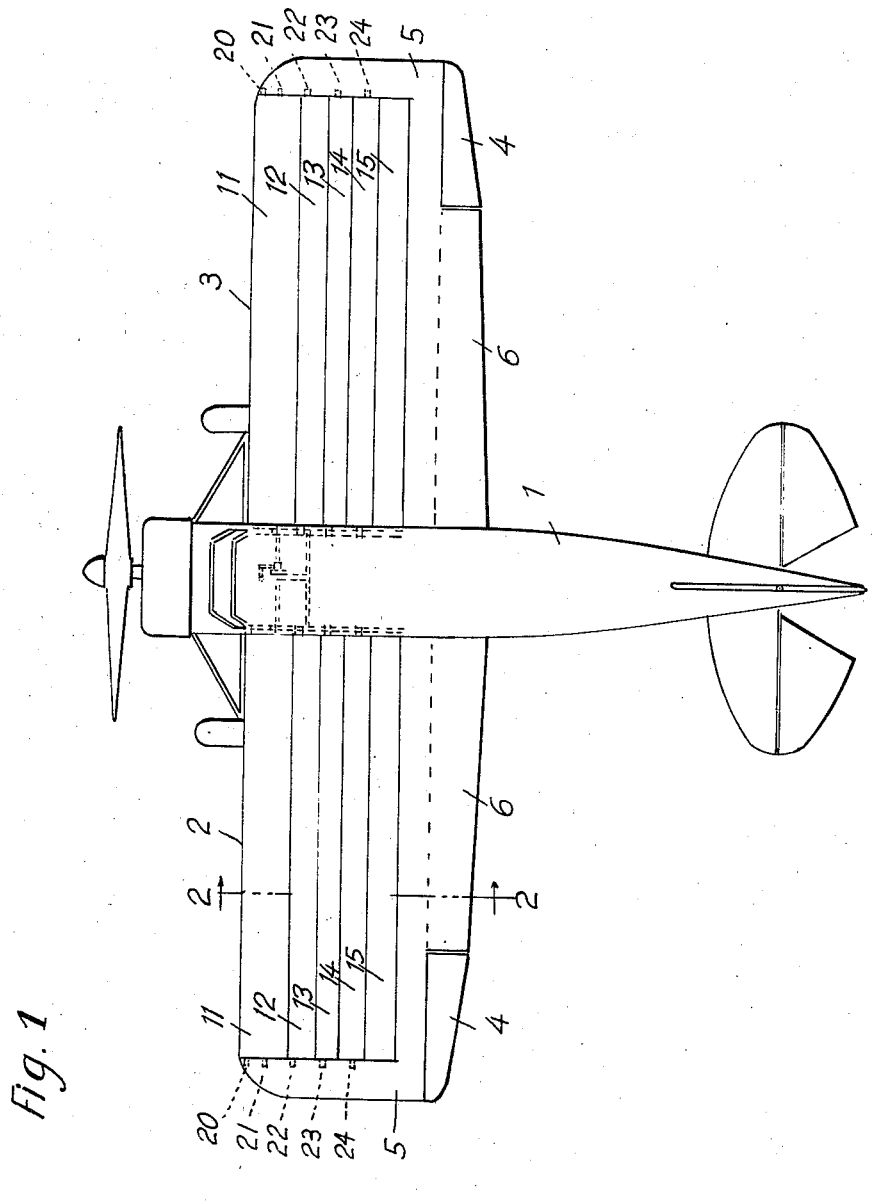

INVENTOR.
William K. Rose
BY
ATTORNEYS

Patented Apr. 13, 1937

2,077,070

UNITED STATES PATENT OFFICE 2,077,070

AIRPLANE

William K. Rose, New York, N. Y.

Continuation of application Serial No. 706,780, January 15, 1934. This application November 10, 1936, Serial No. 110,145

16 Claims. (Cl. 244—42)

This invention relates to airplanes and more particularly to a wing structure therefor which provides for the passage of air through the airfoil as a means for influencing the lift drag ratio (L/D) of the airfoil. The invention is adapted for use in airplanes of the monoplane, biplane or multiplane type irrespective of whether the airfoil is a continuous structure having its span extending from wing tip to wing tip, or is a two part structure divided at the fuselage with one wing attached to each side thereof, or is in part continuous and in part divided. The lift and drag coefficients of the wing structure on opposite sides of the fuselage may be similarly influenced for control about the lateral axis of the plane, or oppositely influenced for control about the longitudinal axis of the plane as is now commonly practiced in the use of ailerons.

This application is a continuation of application serially numbered 706,780, filed January 15, 1934 and allowed August 10, 1936. It is a continuation in part of application serially numbered 706,779, filed January 15, 1934 and allowed August 10, 1936, and application serially numbered 706,781, filed January 14, 1934 and allowed August 10, 1936. In this application, as in application serially numbered 706,780, is disclosed and fundamentally claimed a form of passageway through the airfoil which is employed in the structure shown and described in said applications serially numbered 706,779 and 706,781, and in continuations of said applications filed on even date herewith and serially numbered respectively 110,146 and 110,147.

In this application and in the continuations just enumerated the passageways for air through the airfoil are curved and extend from the lower surface of the airfoil to the upper surface thereof. In certain instances the inlet opening at the lower surface is nearer to the front of the airfoil than to the rear thereof, and in other instances the reverse is true; in certain instances the curvature of the passageways from bottom to top is upward, and in other instances downward. In all of such instances the object of the invention is to give the passageways such form that air passing therethrough will develop an internal force operating either to increase or decrease the lift drag ratio. In developing such internal force the broad principles of the turbine are utilized.

In this application for convenient illustration of the form and operation of such passageways they are shown in the wing structure on both sides of the fuselage as extending through the airfoil structure from bottom to top with their openings at the top rearward of the openings at the bottom and with their curvature from bottom to top upwardly. In such airfoil construction further objects of the invention will now be enumerated.

One of said objects is to utilize said passageways in increasing the lift and decreasing the drag of the airfoil as a whole.

Another of said objects is to direct the air on leaving said passageways rearwardly over the top of the airfoil to reduce substantially the turbulences and vortices accumulating along the upper surface of the airfoil in wing structures not provided with the present invention.

Another of said objects is to afford means for reducing the excessive travel of the center of pressure now characterizing solid airfoils at varying angles of attack.

Another of said objects is to afford means for increasing the angle of attack without stalling over that now obtainable in solid airfoil construction.

Another of said objects is to provide a structure and means whereby the said passageways may be opened and closed, and more particularly whereby said opening and closing is effected at the top of the passageways rather than at the bottom thereof. In attaining this object the vanes or blades bounding and defining the passageways may themselves be movable, or if fixed other movable parts may be provided.

Another of said objects is to provide a structure and means whereby on opening the said passageways the camber of the airfoil, and more particularly at the nosepiece, is increased.

Another of said objects is to provide a structure and means whereby the span of the airfoil may be decreased and its chord increased respecting the proportions now commonly employed with solid wings, with increased efficiency of the airfoil over the solid type of construction.

Further objects of the invention will be apparent as this description proceeds.

The prior art offers many examples of slotted airfoils, but in no case known to me are there disclosed in the prior art passageways so formed and constructed as to operate on the principle of a steam turbine or to develop therein an internal force operating to influence the lift drag ratio of the airfoil. Referring more particularly to the upwardly and rearwardly curved passageways employed for illustration in this application and embodying the general form of passageway herein disclosed, the air on passing therethrough increases in velocity without altering or modifying the turbine effect and on discharging from the passageways rearwardly along the top of the wing combines with the force generated in the passageways in giving greater lift and less drag than is obtainable with any of said prior art structures. I have discovered that it is not desirable to construct the vanes or blades which bound and define the passageways, whether movable or fixed, in the usual form of wing contour illustrated in certain of the prior art patents, but on the contrary that the upper curved surfaces of said vanes or blades should be carried well back as in a steam turbine so that the air passing through the passageways will produce the desired reaction of both an upward and a forward pressure. Generally speaking, heretofore the theory has been just to balance out the turbulences and undesired reactions above the wing, and a straight line passage for air through the slots was provided even though the slots were curved. Such slots operate practically the same as though they were straight instead of curved and if opened to a substantial extent the air passing therethrough from the bottom of the wing to the top by decreasing the pressure below the wing and increasing the pressure above the wing reduces the lift of the wing below that of a solid wing. In the passageways of this invention even when fully open it is preferable to avoid any straight line passage therethrough for air from the lower surface of the wing to the upper surface of the wing. In distinguishing from the prior art, therefore, in the present invention as herein embodied it should be noted that the structure not only performs the function of removing or eliminating to a large extent turbulences and vortices above the wing, but also utilizes the air movement and pressure within the passageways in a useful manner to produce a lift and a forward impulse. By curving the blades or vanes well backward toward the rear at the upper surface of the airfoil as herein set forth all of the air going through the passageways and therein operating in the manner of air on the blades of a turbine engine will perform useful work.

The importance of the foregoing fundamental characteristics distinguishing this invention from the prior art are well illustrated by early tests conducted under my directions. Thus, for example, when using a Clark Y model altered in accordance with this invention in one of these tests a 37° angle of attack was attained without stalling and with the wing having a lift drag ratio of 4. At an angle of attack of 22° the lift drag ratio in this test was about 6, and this without the use of a flap. In comparison with the Clark Y wing modified in accordance with certain prior art structures of slotted wings, the lift drag ratio with my invention was more at a 37° angle of attack than the Clark Y model as thus altered in accordance with the prior art at a 20° angle of attack, although the aspect ratio was 6 with the prior art slotted Clark Y as against 4 altered in accordance with my invention. In these early tests I have been able to cut the drag at high angles of attack to less than one half of that ordinarily occurring with the solid wing, and even at the 37° angle of attack have secured an increased lift.

Obviously the high lift drag ratio made possible by the employment of my invention is of great importance in taking off and in landing and may, of course, be taken advantage of during flight particularly where added maneuverability is desired. Furthermore, it permits decreasing the span and increasing the chord of the airfoil respecting the proportions now commonly employed with solid wings, and in this regard meets a demand long sought for in airfoil dimensions.

With the foregoing preliminary discussion of my invention, I now proceed to a detailed presentation thereof. In so doing I have chosen as a means for illustration a high wing monoplane of conventional form equipped with landing gear for taking off and landing on the ground. It should be understood, however, that this is purely for convenient illustration and is not to be considered in any sense as limitative on the scope of the invention. The drawings are in large part schematic. In these drawings:

Figure 1 is a top view of the airplane provided with a wing structure embodying one form of this invention in which the vanes or blades bounding and defining the pasageways are movable;

Fig. 2 is a sectional view of the airfoil of Fig. 1 approximately on the line 2—2 thereof showing the passageways closed;

Fig. 3 is a sectional view similar to Fig. 2 showing the passageways fully opened;

Fig. 4 is a diagrammatic representation of the airfoil shown in Figs. 2 and 3, being a cross-sectional outline of the vane or blade construction thereof with the vanes or blades in closed position and having the mean cross-sectional lines of the passageways formed by the vanes or blades illustrated in dot and dash lines;

Fig. 5 is a view corresponding with Fig. 4 with the passageways open as illustrated in Fig. 3;

Figure 6:
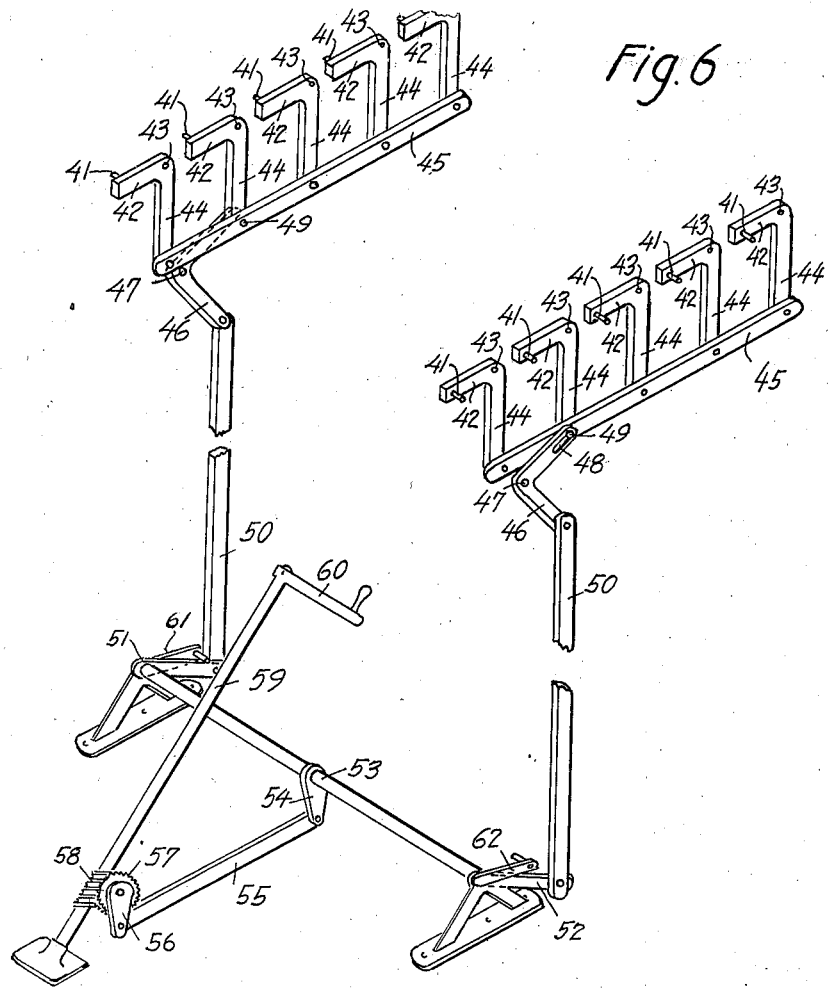
Figure 7:
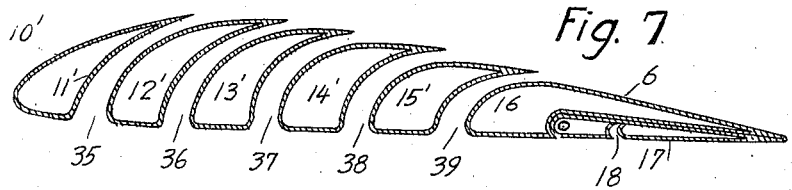

Fig. 6 is a detailed perspective view of one form of manually actuated control mechanism for use in shifting the vanes or blades when movable, said mechanism in part being shown in Figs. 2 and 3; and Fig. 7 is a sectional view on a reduced scale similar to Fig. 3 illustrating another form of my invention in which the blades or vanes bounding and defining the passageways are fixed rather than movable.

Referring to the form of the invention illustrated in Figs. 1, 2, 3, 4, 5 and 6, the fuselage 1 of the airplane is provided with similar wings 2 and 3, one mounted on each side thereof. The wings at the rear are each formed with a trailing edge section 6 which as illustrated, though not of necessity, occupies approximately one-third of the wing chord between ailerons 4 which are mounted on lateral spanwise extending portions of the trailing edge sections 6—6 in a manner well understood in the art and which form no structural part of this invention. From the outer ends of the lateral extensions of the trailing edge sections 6 wing tip sections 5—5 extend forwardly to to leading edge of the wing. The trailing edge sections 6, their lateral extensions and the wing tip sections 5 are formed with the usual bracing and framework commonly employed in airfoil structure and for that reason not herein shown. Aside from the reversal of the wing parts necessitated by the fact that one wing is to the left and the other to the right of the fuselage, the wings are of identical construction and the description of the construction, therefore, can be limited to one wing only, the left wing 2 being selected for this purpose.

Reference being had to Figs. 1, 2 and 3, the leading edge of the wing is formed with a nosepiece 10 of accepted camber. The nosepiece at the rear terminates in a wall which comprises a blade or vane 11. The trailing edge section 6 at the front terminates in a wall which comprises a vane or blade 16. Between the nosepiece blade or vane 11 and the vane or blade 16 of the trailing edge section are suitably mounted blades or vanes 12, 13, 14 and 15. The nosepiece 10 with its rearwardly extending vane or blade 11, the vanes or blades 12, 13, 14 and 15, and the forwardly extending vane or blade 16 of the trailing edge section extend longitudinally of the wing substantially the entire span thereof between the wing tip section 5 and the fuselage 1. The nosepiece 10 and the vanes or blades 12, 13, 14 and 15, like the trailing edge section 6, are preferably hollow except for necessary framework not shown.

There may, if desired, be nested in the trailing edge section 6 a suitably mounted flap 17 which functions in the usual way except that there is provided a fixed passageway 18 formed as a U-slot which (except for structural framework at the sides and intermediate bracings not shown) extends throughout the width of the flap from top to bottom and deflects the air passing therethrough rearwardly when the flap is moved downwardly resulting in a decrease of drag at this point.

Opening and closing the passageways bounded and defined by the vanes or blades 11, 12, 13, 14, 15 and 16 is herein illustrated as effected by relative movement of the vanes or blades themselves. Relative movement thereof to this end may be variously obtained with appropriate mounting of the vanes or blades selected accordingly. However this movement is brought about and however the vanes or blades are mounted, the organization should preferably incorporate means for controlling the extent to which the said passageways are open from a substantially complete closure thereof to a maximum opening in which substantially no air can flow through the passageways in a straight line, so that throughout the operative range of opening the reactive principle of the turbine is utilized with all of the air going through the passageways.

As herein shown the nosepiece 10 with its integral blade or vane 11 and the vanes or blades 12, 13, 14 and 15 by suitable constructions 20, 21, 22, 23 and 24 are pivotally mounted in the framework of the wing tip section 5 at their outer ends and in suitable framework provided in the fuselage 1 at their inner ends. The mounting structure and framework suitable for this purpose are well within the knowledge of those skilled in the art and are not, therefore, herein specifically illustrated, the structure being such that the nosepiece 10 with its integral vane or blade 11 and the vanes or blades 12, 13, 14 and 15 may be rotated upwardly from the closed position shown in Fig. 2 to the open position shown in Fig. 3 and vice versa. The vane or blade 16 on the forward end of the trailing edge section 6 as will be apparent from the foregoing is fixed and not in itself movable in respect to the airfoil. The pivotal points of support of the nosepiece 10 and the vanes or blades 12, 13, 14 and 15 are shown as near their lower surfaces about midway thereof. As will later appear this location of the pivotal points is optional.

The bottom surfaces of the vanes or blades 12, 13, 14, 15 and 16 conform with and in large part determine the lower camber of the wing and should be formed to accord with the desired lower camber. As shown in the airfoil arbitrarily chosen for illustration, the under surface of the wing to the rear of the nosepiece is substantially straight and without camber in the closed position of the vanes or blades illustrated in Fig. 2. Hence, the lower surface of the vanes or blades 12, 13, 14, 15 and 16 are straight and lie in a plane. From the bottom surfaces of the vanes or blades 12, 13, 14 and 15 the vanes are curved upwardly and rearwardly, the curves on the forward surfaces of the vanes or blades being convex and those on the rear surfaces being concave, the rate of curvature of the forward surfaces of the vanes or blades being greater than that of the rearward surfaces thereof so that the vanes or blades gradually taper in cross-section from the bottom to the top. The rearward surface of the vane 11 curves upwardly and rearwardly from the lower surface of the nosepiece 10 in a concave curve of lower rate of curvature than that characterizing the forward surface of the vane or blade 12. The forward surface of the vane or blade 16 curves upwardly and rearwardly from the lower surface of the trailing edge section 6 in front of the flap 17 in a convex curve of greater rate of curvature than that characterizing the rearward surface of the vane or blade 15. The upwardly and rearwardly curved surfaces of each of the vanes or blades may join the lower flat surfaces thereof in angular formation as illustrated in Figs. 2 and 3, or this juncture may be rounded e. g. as in Fig. 7. The height of the vanes or blades and the conformation of their top surfaces to rear of the overlap by the vane or blade next in front conform with and in large part determine the upper camber of the wing and should be determined and formed to accord with the desired upper camber. This will be readily understood from the upper wing camber arbitrarily chosen for illustration without detailed description.

The vanes or blades 11 and 12, 12 and 13, 13 and 14, 14 and 15, and 15 and 16, respectively bound and define spanwise passageways 35, 36, 37, 38 and 39 extending from the lower surface of the wing to the upper surface thereof. In closed position of the vanes or blades the passageways are closed at the top and the cooperating concave surfaces and convex surfaces of the adjacent vanes or blades meet in the upper camber line of the airfoil. When the nosepiece and its vane or blade 11 and the vanes or blades 12, 13, 14 and 15 are rotated upwardly on their pivotal mountings the passageways are opened, means later to be described being provided so that even in maximum open position there is no straight line path for air through the passageways. In all operative open positions of the passageways I have found it advantageous so to construct and arrange the vanes or blades that the passageways themselves gradually diminish in cross-section from bottom to top with their respective mean cross-sectional lines gradually flattening from bottom to top. Satisfactory results have been obtained in testing with curvatures such that the stream of air going through the passageways is deflected at substantially right angles to its plane of entrance, said mean cross-sectional lines of curvatures of the passageways thus subtending an angle of approximately 90°. In such a structure the stream of air is discharged from the passageways along the upper surface of the wing substantially parallel with the lower surface of the wing or the mean camber line thereof.

In the structure illustrated in Figs. 2 and 3 the curvature of the vanes or blades is such that the mean cross-sectional lines of each of these passageways is that of a logarithmic spiral, following in this respect the theoretically correct curvature for turbines, see, for example, "Centrifugal Pumps" by R. L. Daugherty (McGraw Hill Book Co. Inc. 1915), bottom of page 53. This is illustrated in Figs. 4 and 5 which show the segment $m$—$m$ of a logarithmic spiral as the mean cross-sectional line of each passageway. It should be understood that this is for purposes of illustration only. Following more strictly the turbine teaching as indicated throughout the description hereof, the best results obtained by me were with the logarithmic spiral mean cross-sectional line of curvature. As is readily understood, however, by mathematicians and physicists, there is such a close resemblance in segments of various spirals, the involute, logarithmic, Archimedes, parabolic, trumpet, hyperbolic, etc., that designers and builders of airfoils may find it convenient to employ segments of any one of the known spirals without departing from the teachings herein set forth, so that it must not be understood that in illustrating in the preferred form a mean cross-sectional line for the passageways following the logarithmic spiral the invention is to be limited thereto. In the claims hereunto appended employing the term "segment of a spiral" I have used said term in its broadest sense without limitation either to the logarithmic spiral or to any other known form of spiral.

Aside from such alterations in airfoil construction as is necessitated by the incorporation of my invention in the wing structure, the airfoil and the airplane as a whole are intended to be constructed along conventional standardized lines. Suitable and well known mechanism is to be provided for operation of the ailerons 4 and the flaps 17, as will readily be understood.

Mechanism for opening and closing the passageways 35, 36, 37, 38 and 39, with appropriate means for limiting the extent of the opening as above set forth is illustrated more particularly in Figs. 2, 3 and 6, said mechanism being of well known link and bell crank type operated by a worm and worm gear and in itself coming well within the knowledge of those skilled in the art, that shown being merely illustrative and not limitative, other forms of control being available without departing from the spirit of my invention. More particularly, the nosepiece 10 with its vane or blade 11, and the vanes or blades 12, 13, 14 and 15 are each provided with a slot 40 in which is loosely mounted a pin 41 fixedly attached to the end of the short arm 42 of a bell crank suitably pivoted at its elbow as at 43 to the fuselage framework (not shown) adjacent the mounting for the inner ends of the vanes or blades. The slots 40 are so positioned in the nosepiece 10 and the vanes or blades 12, 13, 14 and 15 that when the bell cranks are moved about their respective pivotal points 43 substantially uniform motion is given to the vanes or blades 11, 12, 13, 14 and 15 for assuring a substantially uniform opening of the passageways, the pins 41 moving along the slots in the changing positions of the vanes or blades in a manner well known in a mechanism of this sort. The lower and longer arms 44 of the said bell cranks extend downwardly from the pivotal points 43 being pivoted at their ends to a connecting rod 45 which is substantially parallel with the lower surface of the wing or the mean camber line thereof.

It will be understood that the operating structure thus far described is that provided for the wing 2 at the left of Fig. 1 and that said mechanism is to be duplicated for the wing 3 at the right of Fig. 1 as is shown schematically in dotted lines on the sides of the fuselage 1.

The operating mechanism just above described is suitably connected for simultaneous and uniform actuation from the fuselage, either automatic or manual, to the end that the passageways of both wings shall be simultaneously opened and closed and the extent of their opening identical. For simplification of illustration I have shown a manual control for this purpose. Each of the connecting rods 45 is provided with an actuating bell crank 46 pivotally mounted at its elbow as at 47 to the fuselage (not shown) above referred to. The upper arms of the bell cranks 46 are each provided with a slot 48 in which is loosely mounted a pin 49 fixedly attached to its respective connecting rod 45. The lower arm of the bell cranks 46 are each pivotally connected at their ends with a link 50, which links 50 are in turn pivotally connected respectively with the crank arms 51 and 52 rigidly attached to a rock shaft 53. This rock shaft which is rotatably mounted in the fuselage in suitable journals, is provided with a crank arm 54 rigidly attached thereto. This crank arm 54 is connected by a link 55 with a crank arm 56 rigidly attached to a worm gear wheel 57, the link 55 being pivotally connected with the outer ends of the crank arms 54 and 56 as will readily be understood. The worm gear 57, which is rotatively mounted in the fuselage in suitable journals meshes with a worm 58 rigidly attached on a post 59 rotatably mounted in the fuselage and provided with a wheel or crank 60 conveniently located for operation by the pilot. The worm 58 and the worm gear 57 are of such pitch and construction that the worm gear with its crank arm 56 may be readily turned by the pilot, this action, however, being irreversible so that the parts are locked in any position to which they are moved by the pilot. Suitable stops 61, 62 are provided which coact respectively with the arms 51 and 52 on the rock shaft limiting the upper movement thereof. Furthermore the loose motion slots 40 and 46 may preferably be of such length as to coact with their respective pins 41 and 49 in limiting the upward opening movement of the vanes or blades.

The operation of the mechanism just described, it is believed will be readily understood without detailed description. As shown in Figs. 2 and 6 the position of the mechanism is such as to maintain the nosepiece 10 and its vane or blade 11 and the vanes or blades 12, 13, 14 and 15 in their lowermost position with the passageways 35, 36, 37, 38 and 39 closed. When the pilot turns the wheel or crank 60 in a direction to cause counter clock-wise movement of the crank arms 56, 54, 51 and 52 the links 50 are raised, the bell cranks 46 are moved about their pivotal points 47 in counter clock-wise direction and coincident therewith the connecting rods 45 are simultaneously moved forwardly. Note Figs. 2 and 3. This forward movement of the connecting rods 45 causes clock-wise movement of the bell cranks 42—44 about their pivotal points of support 43, thus moving the nosepiece 10 with its vane or blade 11, and the vanes or blades 12, 13, 14 and 15 upwardly to open the passageways as is illustrated in Fig. 3. With the passageways open, reverse movement of the wheel or crank 60 by the pilot causes clockwise movement of the bell cranks 45 and counter clock-wise movement of the bell cranks 42—44 thus moving the nosepiece with its vane or blade 11, and the vanes or blades 12, 13, 14 and 15 downwardly to close the passageways. The construction and operation of the stops 61 and 62 in relation to the crank arms 51 and 52 respectively and the interaction of the slots 40 and 48 and their respective pins 41 and 49 should be such as to arrest opening movement of the vanes or blades 11, 12, 13, 14 and 15 in positions which prevent a direct line of vision through the passageways 35, 36, 37, 38 and 39 from bottom to top.

Means are thus provided for control of the extent to which the passageways 35, 36, 37, 38 and 39 are open from a complete closure thereof to a maximum opening in which substantially no air can flow through the passageways in a straight line. The vanes or blades 11, 12, 13, 14 and 15 may be swung forwardly and rearwardly on their pivots and relative movement between their adjacent surfaces within the limits just described either automatically or manually controlled.

In taking off, during flight and in landing in the normal operation of the airplane within permissive angles of attack the air pressure beneath the airfoil is in excess of that above the airfoil. Whether the vanes or blades 11, 12, 13, 14 and 15 be actuated automatically or manually, it is on that excess of air pressure beneath the airfoil over that above the airfoil that my invention operates. So long as that excess exists air will flow upwardly through the passageways 35, 36, 37, 38 and 39 provided the passageways are open, and regardless of the extent of the opening. Within the operative limits of the opening, above set forth, the air in passing through the passageways, is subjected to a gradual change of momentum in a curved path, and develops within the wing structure itself internal forces operating to increase the lift and decrease the drag, the reactive principle of the turbine being utilized at all times regardless of the extent to which the passageways are open. Opening and closing the passageways at the top is important in contributing to this action particularly in intermediate positions of the vanes or blades, for in such arrangement the cross-sections of the passageways gradually diminish from bottom to top at all times from closed position of the vanes or blades to their maximum open position above defined.

Coincident with the development of an internal force within the airfoil by air going through the passageways, as above explained, the air on leaving the passageways at the top of the airfoil sweeps rearwardly over the upper surface thereof in a path substantially parallel with the lower surface of the airfoil or the mean camber line. This stream of air eliminates in large part the turbulences and vortices which would otherwise accumulate along the upper surface of the airfoil. Furthermore, this air stream meets the air curling upwardly and forwardly over the trailing edge of the wing at increasing angles of attack and tends to prevent burbling. The drag of the airfoil is greatly diminished and the burbling angle substantially increased over that of solid airfoils.

Tests have shown that the lift drag ratio of the airfoil of Figs. 2 and 3 in open position of the passageways is somewhat improved by the location of the pivotal points 20, 21, 22, 23 and 24 and by the angular junction of the curved surfaces of the vanes or blades 12, 13, 14 and 15 with their straight lower surfaces as specifically illustrated in said figures. In such construction when the vanes or blades are swung upwardly and forwardly as shown in Fig. 3 the front portions thereof will present depending projections 25, 26, 27 and 28 which will act to intercept some of the air passing rearwardly along the lower surface of the airfoil in relation to the line of flight and deflect the same upwardly through the passageways. As heretofore indicated, however, this structure is optional and the lower surfaces of the vanes or blades may be rounded, if so desired, and/or their pivotal points moved forward to avoid the depending projections on movement of the vanes or blades to open position.

Furthermore, by pivotally mounting the nosepiece as above described to be operated in conjunction with the vanes or blades, on moving the nosepiece and the vanes or blades upwardly and forwardly about their respective pivots the upper camber of the airfoil is increased. This increased camber, more particularly at the front of the airfoil, cooperates with the passageways in increasing the lift of the wing and making possible higher angles of attack without stalling.

The increased lift drag ratio of airfoils embodying my invention may be variously utilized in the operation of the plane or in the construction thereof. As to operation, assuming for illustration that the vanes or blades are to be operated manually by the pilot, it is probable that on taking off the pilot will open the passageways to their maximum extent. This is particularly true if the pilot has a comparatively short runway. The pilot will likely keep the passageways fully opened in attaining height, but this is optional and he may regulate the opening as he chooses, depending on a number of considerations among them being the flight path desired. Having attained the desired height for straight away flight it is probable that the pilot will close the passageways and thus cut to a minimum the resistance of the wing for maximum forward speed. On landing it is probable that the pilot will open the passageways to their maximum extent, thus enabling him to reduce the speed of his plane in marked degree over that permissible in airfoils of solid construction and to descend in a steeper path and land in a much smaller field than otherwise would be possible.

It should be understood that the control of the plane as just above illustrated may be automatically simulated.

The increased angles of attack made possible by my invention are of course, advantageous not only in commercial flying, but in military operation of army and navy planes, adding greatly to their maneuverability as well as to their possibility of taking off and landing in small, unconditioned emergency fields selected at random as necessity demands.

Reverting now to the form of my invention illustrated in Fig. 7, comparison of that figure with Fig. 3 discloses that except for the fact that the nosepiece and the vanes or blades are fixed rather than movable the constructions are substantially identical. Fig. 7 may be considered as a cross-section on the line 2—2 of Fig. 1 with the fixed nosepiece and vanes or blades substituted for the movable nosepiece and vanes or blades of Fig. 1. Thus the construction of the wing illustrated in Fig. 7, embodies the trailing edge section 6 rigidly attached to the fuselage 1 and provided with its lateral spanwise extension to which the aileron 4 is suitably attached and from which extends forwardly the wing tip section 5, all as previously described. The nosepiece 10' of accepted camber terminates at the rear in a wall which comprises a vane or blade 11'. Between the nosepiece blade or vane 11' and the vane or blade 16 of the trailing edge section are fixedly mounted blades or vanes 12', 13', 14' and 15'. The nosepiece 10' with its rearwardly extending blade or vane 11', and the vanes or blades 12', 13', 14' and 15' extend longitudinally of the wing substantially the entire span thereof between the wing tip section 5 and the fuselage 1 to which they are fixedly attached, suitable framework (not shown) being provided for this purpose.

The vanes or blades 11', 12', 13', 14', 15' (and of course 16) are curved precisely as are their corresponding vanes or blades in the airfoil of Figs. 2 and 3, and the mean cross-sectional lines of curvature of the passageways formed and defined thereby are identical with those previously described in connection with the said airfoil, said mean cross-sectional line gradually flattening from bottom to top and subtending an angle of approximately 90°. The lower surface of the vanes or blades 12', 13', 14' and 15', however, instead of forming the slightly notched lower surface of the airfoil specifically illustrated in Fig. 3, are constructed to form a smooth lower surface of the airfoil of desired streamline camber. As specifically illustrated the lower surfaces of the vanes or blades 13', 14' and 15' lie in the plane of the lower surface of the trailing edge section 6 in front of the flap 17 and the lower surface of the vane or blade 12' slopes slightly upward from the rear to conform with the lower camber of the nosepiece 10'. Furthermore as heretofore stated, the juncture of the curved surfaces of the vanes or blades with their lower surfaces is rounded rather than angular. The passageways formed and defined by the vanes or blades gradually diminish in cross-section from bottom to top and the vanes or blades are so positioned that there is no straight line passage for air through the passageways from bottom to top. As readily will be understood the airfoil of fixed passageways just described mounted on the left side of the fuselage of Fig. 1, is to be duplicated on the right side of the fuselage.

The airfoil of fixed passageway illustrated in Fig. 7 has the same functional characteristics as the airfoil of Figs. 2 and 3, except that its lift drag ratio is a constant rather than variable at a given angle of attack and velocity. Thus air in passing through the passageways from bottom to top, operating on turbine principles, develops a force in the wing structure itself which increases the lift and decreases the drag; and the stream of air discharged from the passageways travels rearwardly over the upper surface of the airfoil in a path substantially parallel with the lower surface of the airfoil or its mean camber line, eliminates in large part the vortices and turbulences which would otherwise form on the upper surface of the wing, meets the air curling upwardly and forwardly over the trailing edge of the airfoil at increasing angles of attack and tends to prevent burbling, and thus decreases the drag of the airfoil and substantially increases the burbling angle over that of a solid airfoil. It is believed that the functioning and operation of the airfoil of fixed passageways will, therefore, be readily understood without repetition of the detailed description herein above set forth respecting the airfoil of variable passageway.

As to both types of airfoil herein disclosed, whether the vanes or blades be fixed or adjustable, and if adjustable whether manually or automatically actuated, it will be understood that the ailerons 4 and the flaps 16 (if present) will be utilized and operated to effect their respective purposes in like manner as with airfoils of ordinary solid construction.

One of the structural advantages which may be effected by reason of the increased lift drag ratio made possible by my invention, whether the passageways characterizing the same be fixed or whether their opening be adjustable by one means or another, is a shortening of the span and a lengthening of the chord. The number of passageways illustrated in both forms of my invention is optional and within limits is to be determined by the type of plane desired and the use to which it is to be put.

I have discovered that with airfoils embodying my invention the excessive travel of the center of pressure at the changing angles of attack characterizing airfoils of solid construction is greatly diminished. There is, however, considerable change in the chordwise location of the center of pressure along the lower surface of the wing in changing angles of attack in part due to operation of the plane within the increased angles of attack made possible by my invention. It is advantageous to space the passageways along the bottom of the airfoil and to have a sufficient number thereof so that the center of pressure in its travel back and forth chordwise of the lower surface will so far as possible be positioned substantially in line with one of the passageways in all permissible angles of attack.

I have further discovered that the lower surface of the vanes or blades should be substantially wider than the passageways so that the airfoil will have a lower supporting area on its under surface substantially in excess of the combined cross-section area of the passageways at their bottom.

In respect to number of passageways and the relation of their size of opening to the width of the vanes or blades at the bottom, the airfoils following Figs. 2, 3 and 7 have been found to give satisfactory results, but as hereinabove set forth the structure there shown is illustrative and not limitative.

With these considerations in mind (the travel of the center of pressure and the supporting area of the lower wing surface) the airfoil designer and constructor by properly determining the number of passageways to be employed may regulate the span and the chord of the airfoil embodying my invention to suit best the type of plane to be designed and constructed and the use to which that plane is primarily to be put. Where speed is the primary consideration the span may be shortened and the chord lengthened to a greater extent than is now possible with the airfoil of solid construction. When weight carrying is the primary consideration the span may not be shortened and the chord may not be increased to the same extent as for maximum speed requirements, but great improvement is possible over solid wing structures in cutting down head resistance by shortening the span. In either case the shortening of the span and lengthening of the chord are accomplished without loss of lift during operative open positions of the passageways if within the limitations above set forth their number be properly determined, and by confining the mass weight of the plane within a smaller radius from the center of gravity the lateral stability of the plane is increased.

From the foregoing it will be seen that the passageways and the vanes or blades which bound and define them, in the structures herein chosen for illustration have and perform the twofold function of increasing the lift and decreasing the drag of the airfoil in which they are embodied. These functions (the vanes or blades being otherwise formed and constructed to embody the turbine principles of operation as herein above set forth) are dependent upon the direction of curvature upwardly and rearwardly characterizing those structures. With the upwardly and rearwardly curved passageways embodying my invention the resultant force vector computed at the center of pressure is directed upwardly and forwardly at less than a 90° angle from the reference chord line of the wing as examples of the effect in changing the direction of curvature, the following are noted:

If the passageways are curved downwardly and forwardly the resultant force vector computed as above would be directed downwardly and forwardly at less than a 90° angle from the reference chord line, and the force developed in the wing structure would decrease the lift and the stream of air discharged from the passageways would increase the drag of the airfoil. Such passageways are set forth in my previously defined application Serial No. 706,781, filed January 15, 1934, and in the continuation of that application Serial No. 110,147, filed on even date herewith, wherein said passageways are illustrated in combination with upwardly and rearwardly curved passageways for lateral control of the plane about its longitudinal axis and wherein claims are directed to that combination.

If the passageways are curved upwardly and forwardly the resultant force vector computed as above would be directed upwardly and rearwardly at less than a 90° angle from the reference chord line of the wing and the force developed in the wing structure, while adding lift thereto would operate as a drag tending to retard the speed of the plane. The air discharged from the passageways in a forward and upward direction would likewise induce a drag. Such passageways are set forth in my previously defined application Serial No. 706,779, filed January 15, 1934, and in the continuation of that application Serial No. 110,146, filed on even date herewith, said passageways are illustrated in combination with upwardly and rearwardly curved passageways for regulating the lift drag ratio of the airfoil to accord with the conditions of take-off flight and landing and wherein claims are directed to that combination.

I have, therefore, developed and herein disclosed and broadly claimed passageways which may be variously formed and placed in airfoils to influence the lift and drag thereof and by which the lift drag ratio may be predetermined as desired, other constants of the plane being taken into consideration.

The foregoing description and illustrations have been given for clearness of understanding and no undue limitations should be deduced therefrom, but the appended claims should be construed as broadly as permissible in view of the prior art.

What I claim is:

1. An airplane wing structure provided with a plurality of vanes or blades forming passageways therebetween extending through the wing from the lower surface to the upper surface thereof, the vanes or blades being formed with cooperating curved surfaces so constructed and arranged that the cross-section of each passageway gradually diminishes from inlet to outlet thereof and has as its mean line a curve which gradually flattens from bottom to top and comprises the segment of a spiral, the vanes or blades being so placed that there is no appreciable straight line passage for air therebetween, whereby as pressure air passes through the said passageways internal forces are developed in the wing operating to influence the lift drag ratio thereof.

2. An airplane wing structure provided with a plurality of vanes or blades forming passageways therebetween extending through the wing from the lower surface to the upper surface thereof, the vanes or blades being formed with cooperating curved surfaces extending upwardly and rearwardly from the lower surface of the wing and being so constructed and arranged that the cross-section of each passageway gradually diminishes from bottom to top and has as its mean line a curve which gradually flattens from bottom to top and subtends an angle of approximately 90°, the vanes or blades being so placed that there is no appreciable straight line passage for air therebetween whereby as pressure air passes through the said passageways internal forces are developed in the wing operating to increase the lift and decrease the drag thereof.

3. An airplane wing structure comprising a nosepiece terminating at the rear in a wall having an upwardly and rearwardly curved surface constituting a vane or blade, a trailing edge section terminating at the front in a wall having an upwardly and rearwardly curved surface constituting a vane or blade, a plurality of vanes or blades each having upwardly and rearwardly curved surfaces mounted intermediate the nosepiece vane or blade and the trailing edge section vane or blade, the adjacent surfaces of said vanes or blades cooperating to form passageways therebetween extending through the wing from the lower surface to the upper surface thereof and being so constructed and arranged that the cross-section of each passageway gradually diminishes from bottom to top and has as its mean line a curve which gradually flattens from bottom to top and subtends an angle of approximately 90°, the vanes or blades being so mounted that there is no appreciable straight line passage for air therebetween, whereby as pressure air passes through the said passageways internal forces are developed in the wing operating to increase the lift and decrease the drag thereof.

4. An airplane wing structure formed with spanwise passageways extending therethrough upwardly and rearwardly from the lower surface to the upper surface thereof, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so placed that there is no appreciable straight line passage for air therebetween, whereby as pressure air passes through the said passageways internal forces are developed in the wing operating to increase the lift and decrease the drag.

5. An airplane wing structure formed with spanwise passageways extending therethrough upwardly and rearwardly from the lower surface to the upper surface thereof, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so placed that there is no appreciable straight line passage for air therebetween, the curvature of the blades being such that air passing upwardly through the passageways is discharged substantially parallel with the mean camber line, the vanes or blades being so constructed and arranged that as pressure air passes through the said passageways internal forces are developed in the wing operating to increase the lift and decrease the drag.

6. An airplane wing structure formed with a plurality of spanwise passageways extending therethrough upwardly and rearwardly from the lower surface to the upper surface thereof terminating in parallel slots in the upper surface of the wing to the rear of the peak of the upper camber of the wing, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so placed that there is no appreciable straight line passage for air therebetween, the curvature of the blades being such that air passing upwardly through the said slots is discharged substantially parallel with the mean camber line, the vanes or blades being so constructed and arranged that as pressure air passes through the said passageways internal forces are developed in the wing operating to increase the lift and decrease the drag.

7. An airplane wing structure having a plurality of passageways extending therethrough from the lower surface to the upper surface thereof, said passageways being formed and defined by members located intermediate the leading and trailing edges and extending longitudinally of the wing to near the outer end of the wing structure, each of said members having its lower end flat and lying substantially in the plane of the lower surface of the wing with its forward and rear edges rounded, each of said members being curved upwardly and rearwardly from bottom to top with a tapering cross-section terminating in a lineal edge lying substantially in the plane of the upper surface of the wing and being characterized by such curvature that respecting any one of the said passageways the rate of curvature of the surface constituting the rearward boundary of the passageway is greater than that constituting the forward boundary of the passageway, and the members being so constructed and arranged that each of the said passageways gradually diminishes from bottom to top and has no appreciable straight line passage for air from bottom to top and has as the mean line of its cross-section a curve gradually flattening from bottom to top, whereby pressure air on passing upwardly through the said passageways develops an internal force producing a lifting action and decreases the drag and is then directed rearwardly toward the trailing edge of the wing substantially parallel with the mean camber line thereof.

8. An airplane wing structure formed with passageways extending therethrough from the lower surface to the upper surface thereof, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so mounted that there is no appreciable straight line passage for air therebetween, whereby as pressure air passes through the said passageways internal forces are developed in the wing operating to influence the lift drag coefficient thereof, and means for controlling the extent to which the said passageways are open from a substantially complete closure thereof to a maximum opening in which substantially no air can flow through the passageways in a straight line.

9. An airplane wing structure provided with a plurality of vanes or blades forming passageways therebetween extending through the wing from the lower surface to the upper surface thereof, the vanes or blades being formed with cooperating curved surfaces extending upwardly and rearwardly from the lower surface of the wing and being so constructed and arranged that the cross-section of each passageway gradually diminishes from bottom to top and has as its mean line a curve which gradually flattens from bottom to top and subtends an angle of approximately 90°, and means for opening and closing said passageways at the top thereof and for controlling the extent to which the said passageways are open from a substantially complete closure thereof to a maximum opening in which substantially no air can flow through the passageways in a straight line, there being no appreciable straight line passage for air from bottom to top through the passageways in any permissible opening thereof, whereby as pressure air passes through the said passageways internal forces are developed in the wing operating to increase the lift and decrease the drag thereof.

10. An airplane wing structure comprising a nose-piece terminating at the rear in a wall having an upwardly and rearwardly curved surface constituting a vane or blade, a trailing edge section terminating at the front in a wall having an upwardly and rearwardly curved surface constituting a vane or blade, a plurality of vanes or blades each having upwardly and rearwardly curved surfaces mounted intermediate the nose-piece vane or blade and the trailing edge section vane or blade, the adjacent surfaces of said vanes or blades cooperating to form passageways therebetween extending through the wing from the lower surface to the upper surface thereof and being so constructed and arranged that the cross-section of each passageway gradually diminishes from bottom to top and has as its mean line a curve which gradually flattens from bottom to top and subtends an angle of approximately 90°, and means for opening and closing said passageways at the top thereof and for controlling the extent to which passageways are open from a substantially complete closure thereof to a maximum opening in which substantially no air can pass through the passageways in a straight line, there being no appreciable straight line passage for air from bottom to top through the passageways in any permissible opening thereof, whereby as pressure air passes through the said passageways internal forces are developed in the wing operating to increase the lift and decrease the drag thereof.

11. An airplane wing structure formed with spanwise passageways extending therethrough upwardly and rearwardly from the lower surface to the upper surface thereof, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so mounted that there is no appreciable straight line passage for air therebetween, whereby as pressure air passes through the said passageways internal forces are developed in the wing operating to increase the lift and decrease the drag, and means for controlling the extent to which the said passageways are open from a substantially complete closure thereof to a maximum opening in which substantially no air can flow through the passageways in a straight line.

12. An airplane wing structure formed with spanwise passageways extending therethrough upwardly and rearwardly from the lower surface to the upper surface thereof, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so mounted that there is no appreciable straight line passage for air therebetween, whereby as pressure air passes through the said passageways internal forces are developed in the wing operating to increase the lift and decrease the drag, and means for effecting relative movement between the vanes or blades and thereby controlling the extent to which the said passageways are open from a substantially complete closure thereof to a maximum opening in which substantially no air can flow through the passageways in a straight line.

13. An airplane wing structure formed with spanwise passageways extending therethrough upwardly and rearwardly from the lower surface to the upper surface thereof, each of said passageways being bounded and defined by pivotally mounted vanes or blades formed with cooperating curved surfaces so constructed and arranged that the cross-section of each passageway in all positions of its bounding vanes or blades gradually diminishes from bottom to top and has as its mean line a curve which gradually flattens from bottom to top and comprises the segment of a spiral and the vanes or blades being so mounted that there is no appreciable straight line passage for air therebetween, whereby as pressure air passes through the said passageways internal forces are developed in the wing operating to increase the lift and decrease the drag, and means for swinging the vanes or blades forwardly and rearwardly on their pivots and for controlling the extent to which the said passageways are open from a substantially complete closure thereof to a maximum opening in which substantially no air can flow through the passageways in a straight line.

14. An airplane wing structure provided with a pivoted nosepiece so constructed and arranged that when the nosepiece is swung forwardly on its pivot its effective upper camber is increased, the nosepiece being formed at the rear with an upwardly and rearwardly curved surface, said wing structure being formed with a plurality of spanwise passageways extending therethrough upwardly and rearwardly from the lower surface to the upper surface thereof, each of said passageways being bounded and defined by pivotally mounted vanes or blades, the rear wall of the nosepiece constituting the forward vane or blade of the passageway nearest the leading edge, the vanes or blades being formed with cooperating curved surfaces so constructed and arranged that the cross-section of each passageway in all positions of its bounding vanes or blades gradually diminishes from bottom to top and has as its mean line a curve which gradually flattens from bottom to top and comprises the segment of a spiral and the vanes or blades being so mounted that there is no appreciable straight line passage for air therebetween, whereby as pressure air passes through the said passageways internal forces are developed in the wing operating to increase the lift and decrease the drag, and means for swinging the nosepiece and the vanes or blades forwardly and rearwardly on their pivots and for controlling the extent to which the said passageways are open from a substantially complete closure thereof to a maximum opening in which substantially no air can flow through the passageways in a straight line.

15. In an airplane the combination of a power driven propeller, a wing characterized by a chord comparatively long in relation to the span and provided with numerous spanwise passageways extending therethrough upwardly and rearwardly from the lower surface to the upper surface thereof from the front of the wing to well toward the rear of the wing, each of said passageways being bounded and defined by vanes or blades formed with cooperating curved surfaces so constructed and arranged that the cross-section of each passageway gradually diminishes from bottom to top and has as its mean line a curve which gradually flattens from bottom to top and comprises the segment of a spiral, the vanes or blades being so placed that there is no appreciable straight line passage for air therebetween, and projections depending from the lower surface of the wing acting to direct a portion of the air stream beneath the wing upwardly through said passageways, the said passageways being so constructed and arranged that the air thus passing therethrough develops internal forces in the wing operating to increase the lift and decrease the drag of the plane in flight.

16. In an airplane of the character described, the combination of a power driven propeller, a fuselage, a pair of wing members mounted on the fuselage, each wing member including a plurality of pivotally mounted blades, the pivotal points of the respective blades extending parallel with the span of the wings and the blades being characterized as formed with plane bottom surfaces lying substantially in the same plane as the lower surface of the wing from which the blades are curved and tapered upwardly and rearwardly so that their upper ends lie in substantially the same plane as the upper surface of the wing in the closed position of the blades, the cooperating curved surfaces of the blades being such that the cross-section of each passageway bounded and defined thereby gradually diminishes from bottom to top and has as its mean line a curve which gradually flattens from bottom to top and comprises the segment of a spiral, means for swinging the blades upwardly around their pivotal points to open air passageways between the blades from the lower surface of the wing to the upper surface of the wing and for controlling the extent to which said passageways are open from a substantially complete closure thereof to a maximum opening in which substantially no air can flow through the passageways in a straight line, the formation and mounting of the blades being such that when in open position the front surfaces of the blades constitute projections depending from the lower surface of the wing acting to direct a portion of the air stream beneath the wing upwardly through said passageways.

WILLIAM K. ROSE.